United States Patent [19]

Weber

[11] Patent Number: 5,032,965
[45] Date of Patent: Jul. 16, 1991

[54] ADJUSTMENT INSERT FOR AIMING DEVICES

[75] Inventor: Walter K. Weber, Grand Rapids, Mich.

[73] Assignee: KB Lifgting, Inc., Kentwood, Mich.

[21] Appl. No.: 407,920

[22] Filed: Sep. 15, 1989

[51] Int. Cl.⁵ .............................................. F21M 3/18
[52] U.S. Cl. ...................................... 362/428; 362/66
[58] Field of Search ................... 362/61, 66, 70, 421, 362/427, 428, 289; 74/88.15

[56] References Cited

U.S. PATENT DOCUMENTS

| | | | |
|---|---|---|---|
| 4,621,307 | 11/1986 | Weber | 362/66 |
| 4,689,725 | 8/1987 | Saijo et al. | 362/66 |
| 4,722,029 | 1/1988 | Ahle et al. | 362/66 |
| 4,849,860 | 7/1989 | Schauwecker | 362/421 |
| 4,884,174 | 11/1989 | Dorleans | 362/421 |
| 4,894,754 | 1/1990 | Levilain | 362/66 |

Primary Examiner—Ira S. Lazarus
Assistant Examiner—Richard R. Cole
Attorney, Agent, or Firm—Michael J. Striker

[57] ABSTRACT

An adjustment insert for positioning an aiming device on a support comprises a body having a partially spherical calotte for receiving a turnable connecting element for connecting the body to a support, a clamp provided on the body for clamping the body in a guide of an aiming device, and a flexible retainer provided on the body and retaining the connecting member in the partially spherical calotte and at the same time allowing a turning of the connecting member relative to the body.

10 Claims, 3 Drawing Sheets

ADJUSTMENT INSERT FOR AIMING DEVICES

BACKGROUND OF THE INVENTION

The present invention relates to an adjustment insert for connecting an aiming device, for example a headlamp to a support on an automobile.

Connecting devices of the above-mentioned general type for connecting the headlamps to the supports are known in the art. Some disadvantages of the know connecting devices is that they are not universal for different positions and lamp configurations and are designed for specific car conditions and specific lamp configurations. Another disadvantage of the know connecting devices is that they are quite difficult to assemble, and the geometry for an attachment area is rather complicated.

SUMMARY OF THE INVENTION

Accordingly, it is an object of the present invention to provide an adjustment insert for aiming devices, which avoids the disadvantages of the prior art.

More particularly, it is an object of the present invention to provide an adjusting insert which can be used for more than one particular car condition, for different positions and different lamp configurations.

It is also an object of the present invention to provide an adjusting insert which is simple to assemble and has a simple geometry for an attachment area.

In keeping with these objects and with others which will become apparent hereinafter, one feature of the present invention resides, briefly stated, in an adjustment insert for positioning an aiming device on a support which comprises a body having a partially spherical calotte for receiving a turnable connecting element for connecting the body to a support, clamping means provided on the body for clamping the body in a guide of an aiming device, and flexible retaining means provided on the body and retaining the connecting member in the partially spherical calotte and at the same time allowing a turning of the connecting member relative to the body.

In accordance with another feature of the present invention, the body has a longitudinal axis and two edges located at both sides of said longitudinal axis, the clamping means including at least two flexible ears each provided on a respective one of said edges and compressible during insertion of the body in the guide of the aiming device to apply a side pressure.

In accordance with still another feature of the present invention, the clamping means include four such flexible ears arranged so that two of the flexible ears are arranged on each of the edges of said body.

It is a further feature of the present invention, that the adjustment insert further comprises means for limiting an insertion of the body in the guide of the aiming device.

Still a further feature of the present invention is that the body has a longitudinal axis, and a front end and a rear end spaced from one another in direction of the longitudinal axis, the limiting means including at least one end tab provided on the rear end of said body.

In accordance with an additional feature of the present invention, the limiting means includes two such end tabs provided at the rear end of the body and arranged at opposite sides of the longitudinal axis.

In accordance with still an additional feature of the present invention the clamping means further includes two projections located at both sides of the longitudinal axis and extending substantially in the direction of the longitudinal axis, the projections having a front end provided with an engaging formation engageable behind the guide of the aiming device.

It is a further feature of the present invention that the flexible retaining means includes at least one flexible retaining tongue located opposite to the partial spherical calotte and arranged to abut against a portion of the connecting element at the opposite end of the calotte.

In accordance with the invention the body has a longitudinal axis the flexible retaining means including two such flexible tongues arranged at opposite sides of the longitudinal axis.

Still another feature of the present invention is that the partially spherical calotte is locally closed, and further comprises means for locally closing the partially spherical calotte, including at least one partially spherical piece extending from the body and locally closing the partially spherical calotte.

In accordance with a further feature of the present invention the locally closing means include two such partially spherical pieces formed at opposite sides of the partially spherical calotte.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
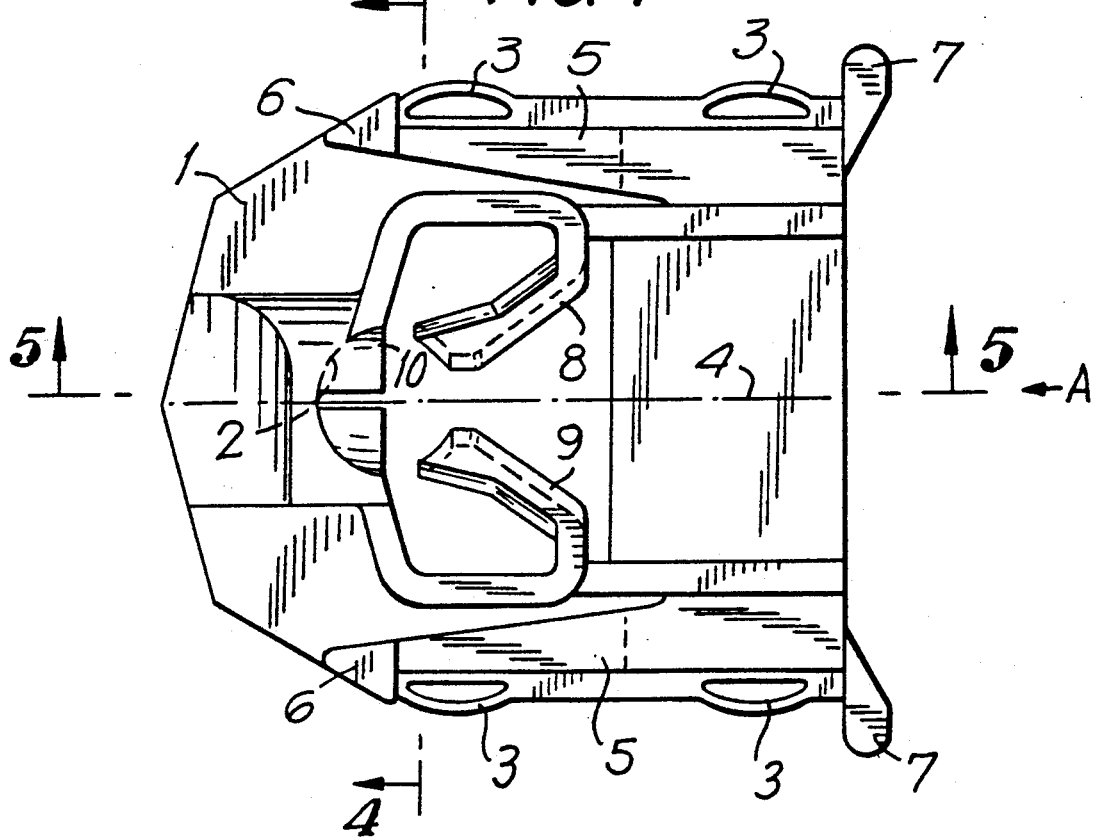
FIG. 1 is a plan view of an adjustment insert in accordance with the present invention seen from above.
Figure 2:
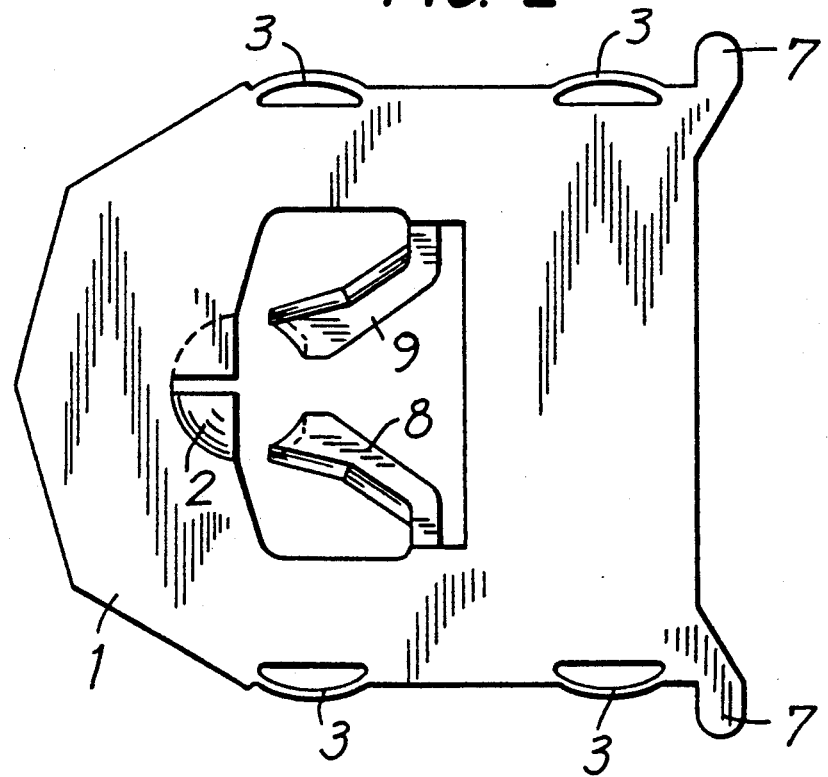
FIG. 2 is a view showing an adjustment insert in accordance with the present invention as seen from below.

An adjustment insert in accordance with the present invention for connecting an aiming device to a support has a body identified as a whole with reference numeral 1. The body 1 is provided with a partially spherical calotte for receiving a connecting element which connects the insert to the support. The calotte is identified with reference numeral 2. The body 1 is provided with clamping means for clamping the body in a guide of the aiming device. The clamping means include four flexible ears 3 each having a closed contour as can be seen from the drawings. The ears 3 are arranged so that each pair of the ears are provided on an edge of the body at one side of its longitudinal axis 4. When the body is inserted into a guide of the aiming device by sliding in direction of the arrow A, the flexible ears 3 of the clamping means are compressed and apply a side pressure to the walls of the guide. The clamping means further include two projections 5 located at opposite sides of the longitudinal axis and extending substantially in the direction of the longitudinal axis. Each projection 5 is provided at its front end with an engaging formation 6 arranged to engage behind a front end of the guide of the aiming device.

Means are provided for limiting the insertion of the adjustment insert into the guide of the aiming device. The limiting means includes two end tabs 7 located at the rear end of the body 1 at opposite sides of the longitudinal axis 4. As can be seen from the drawings, the end tabs 7 extend laterally outwardly beyond the flexible ears 3. The end tabs limit the insertion of the adjustment insert into the guide of the aiming device from the rear side.

Figure 3:
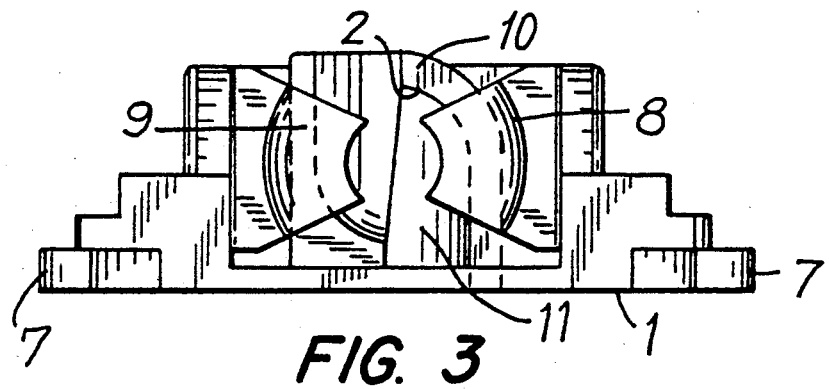
FIG. 3 is an end view of the adjustment insert as seen in the direction of the arrow A in FIG. 1.
Figure 4:
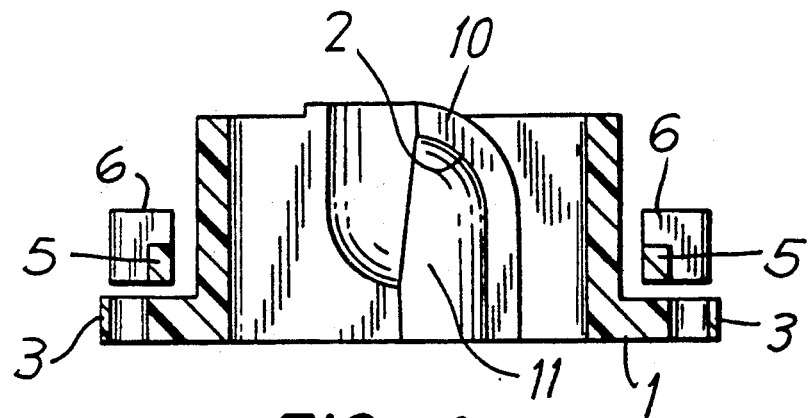
FIG. 4 is a view showing a section taken along the line 4—4 in FIG. 1.
Figure 5:
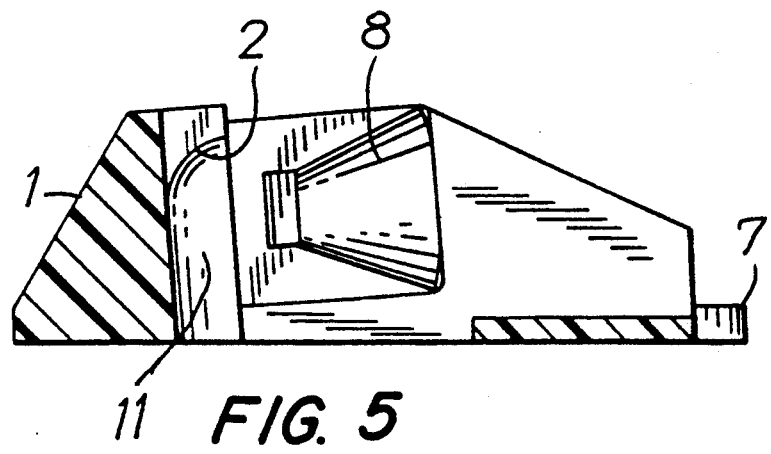
FIG. 5 is a view showing a section of the inventive adjustment insert, taken along the line 5—5 in FIG. 1.
Figure 6:
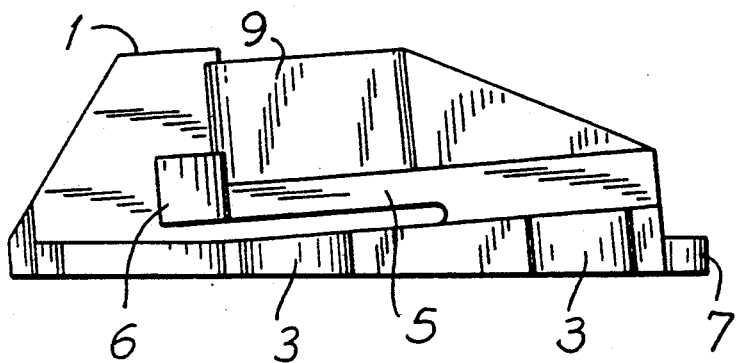
FIG. 6 is a side view of the adjustment insert in accordance with the present invention.

The body 1 is further provided with means for retaining the connecting element in the partially spherical calotte. The retaining means includes two somewhat flexible tongues 8, 9 located at opposite sides of the longitudinal axis 4 and opposite to the calotte 2. Each tongue 8, 9 of the retaining means has a partially cylindrical end. As can be seen from FIG. 3, the calotte 2 has two cover pieces 10 located at diametrically opposite sides of the longitudinal axis 4 and partially covering the calotte so as to provide small passages 11 for passing a connecting element.

Figure 7:
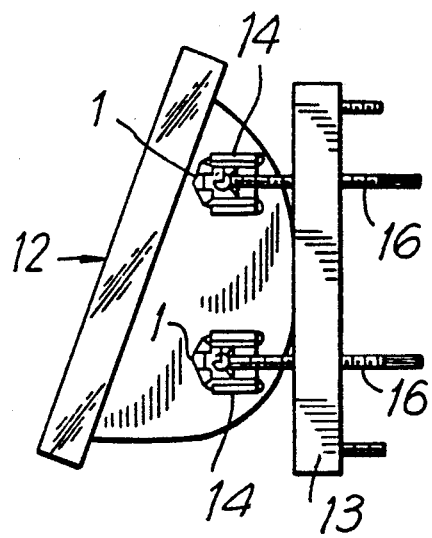
FIG. 7 is a view showing a side view of an aiming device provided with an adjustment insert of the present invention and attached to a support.
Figure 8:
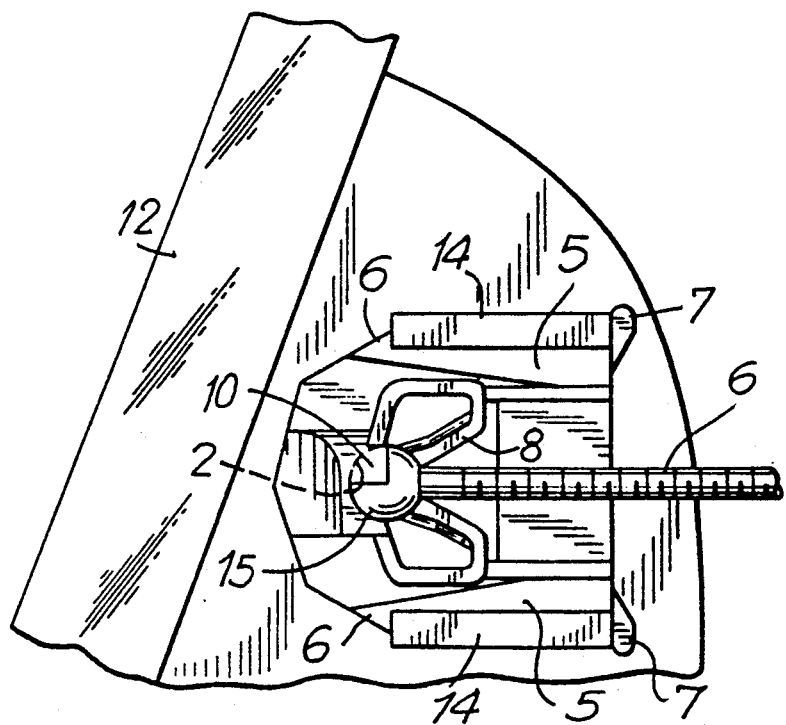
FIG. 8 is an enlarged view of a fragment of FIG. 7.

The process of mounting of an aiming device such as, for example a headlamp 12 on a support 13 is illustrated in FIGS. 7 and 8. First the insert is inserted by sliding the same into a guide 14 provided on the aiming device 12. The flexible ears 3 are compressed and apply a lateral pressure, the engaging formations 6 engage forwardly beyond the front end of the guide, the end tabs 7 abut against a rear end of the guide, so that the insert is reliably fixed in place. Then a connecting element 16 is screwed with its threaded end into the support 13. The support 13 is fitted on a rear end of the aiming device 12 and a spherical head 15 of the connecting element 16 is pressed into the space between the calotte 2 and the retaining tongues 8, 9 through one of the passages 11. Due to the flexible nature of the tongues, it is reliably retained inside the space being additionally covered by one of the cover pieces 10 from above. For mounting the aiming device 12 on the support 13 three such adjustment inserts are required so as to provide a connection in at least three points. When the connection in three points is established, the connecting elements 16 are turned by a suitable tool at their distal ends individually and thereby are displaced longitudinally by respective different distances over interengaging threads provided on the connecting elements in the support so as to adjust an angular position of the aiming device 12 relative to the support 13. The displacement by the different distances is possible due to the turnable retention of the connecting elements in the calottes.

In accordance with the present invention, the adjustment insert is formed as a one-piece member which is preferably composed of a synthetic plastic material. In other words, the parts 1, 2, 3, 5, 6, 7, 8, 9, 10 together form an integral one-piece element.

It will be understood that each of the elements described above, or two or more together, may also find a useful application in other types of constructions differing from the types described above.

While the invention has been illustrated and described as embodied in an adjustment insert for mounting an aiming device on a support, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An adjustment device for positioning an aiming device on a support, comprising a non-circular flat body having a partially spherical calotte for receiving a turnable connecting element for connecting said body to the support; clamping means provided on said body for clamping said body in a guide of the aiming device; and flexible retaining means provided on said body and retaining said connecting element in said partially spherical calotte and at the same time allowing a turning of said connecting element relative to said body, said body having a longitudinal axis and two edges located at both sides of said longitudinal axis, said clamping means including at least two closed-contour flexible ears each provided on a respective one of said edges and compressible during insertion of said body in the guide of the aiming device to apply a side pressure, each of said flexible ears being formed so that an opening is provided between a respective one of said ears and said body, said ear being compressible during insertion of said body by caving into said opening.

2. An adjustment insert as defined in claim 1, wherein said clamping means include four such flexible ears arranged so that two of said flexible ears are arranged on each of said edges of said body one after the other in an insertion direction.

3. An adjustment insert as defined in claim 1; and further comprising means for limiting an insertion of said body in the guide of the aiming device.

4. An adjustment insert as defined in claim 3, wherein said body has a longitudinal axis, and a front end and a rear end spaced from one another in direction of said longitudinal axis, said limiting means including at least one end tab provided on said rear end of said body.

5. An adjustment insert as defined in claim 4, wherein said limiting means includes two such end tabs provided at said rear end of said body and arranged at opposite sides of said longitudinal axis.

6. An adjustment insert as defined in claim 1, wherein said clamping means further includes two projections located at both sides of said longitudinal axis and extending substantially in the direction of said longitudinal axis, said projections having a front end provided with an engaging formation engageable behind the guide of the aiming device.

7. An adjustment insert as defined in claim 1, wherein said flexible retaining means includes at least one flexible retaining tongue located opposite to said partial spherical calotte and arranged to abut against a portion of the connecting element at the opposite end of said calotte.

8. An adjustment insert as defined in claim 7, wherein said body has a longitudinal axis, said flexible retaining means including two such flexible tongues arranged at opposite sides of said longitudinal axis.

9. An adjustment insert as defined in claim 1, wherein said partially spherical calotte is locally closed; and further comprising means for locally closing said partially spherical calotte, including at least one partially spherical piece extending from said body and locally closing said partially spherical calotte.

10. An adjustment insert as defined in claim 9, wherein said locally closing means include two such partially spherical pieces formed at opposite sides of said partially spherical calotte.

* * * * *